United States Patent
Roberts et al.

(10) Patent No.: US 7,642,727 B2
(45) Date of Patent: Jan. 5, 2010

(54) AUTOMOTIVE HIGH INTENSITY DISCHARGE BALLAST

(75) Inventors: Bruce Roberts, Mentor on the Lake, OH (US); Tony Aboumrad, Parma, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 11/648,195

(22) Filed: Dec. 29, 2006

(65) Prior Publication Data
US 2008/0157694 A1  Jul. 3, 2008

(51) Int. Cl.
*H05B 41/16* (2006.01)

(52) U.S. Cl. .................. 315/247; 315/224; 315/307; 315/291; 315/209 R

(58) Field of Classification Search .......... 315/247, 315/246, 224, 225, 209 R, 291, 307–311; 363/131–134, 98, 95, 63, 56.06, 55, 56.01, 363/22, 24, 26, 31, 29, 16, 17; 323/349–351, 323/343–346, 304, 311–313, 265, 266, 274, 323/223–226, 220
See application file for complete search history.

(56) References Cited

U.S. PATENT DOCUMENTS

| | | | | |
|---|---|---|---|---|
| 6,034,487 | A * | 3/2000 | Yamashita et al. | 315/244 |
| 6,489,732 | B2 * | 12/2002 | Ito et al. | 315/308 |
| 6,720,740 | B2 | 4/2004 | Toyama | |
| 2005/0110428 | A1 | 5/2005 | Crandall et al. | |
| 2005/0110431 | A1 | 5/2005 | Ben-Yaakov | |
| 2008/0203937 | A1 * | 8/2008 | Hooijer et al. | 315/276 |

FOREIGN PATENT DOCUMENTS

| GB | 2 352 342 A | 1/2001 |
|---|---|---|
| GB | 2 352 889 A | 2/2001 |
| WO | WO 2004/014111 A1 | 2/2004 |

* cited by examiner

*Primary Examiner*—Tuyet Vo
(74) *Attorney, Agent, or Firm*—Fay Sharpe LLP

(57) ABSTRACT

A new ballast circuit for automotive high intensity discharge (HID) applications is disclosed. The ballast utilizes two DC/DC converters and two low frequency inverter switches. The ballast also includes an integrated high voltage ignition circuit. The positive DC/DC converter builds up a high ignition voltage in addition to raising the DC position bus. When the lamp breaks down, the DC bus voltage decreases and the ignition circuit falls inactive. The DC/DC stages are then alternately conductive to supply power to the lamp via the low frequency inverter switches. The disclosed ballast reduces the number of the switches used to four from a typical six, it utilizes independently controlled voltage source, and provides a more efficient run-up voltages waveform during pre-steady state running of the lamp.

21 Claims, 4 Drawing Sheets

AUTOMOTIVE HIGH INTENSITY DISCHARGE BALLAST

BACKGROUND OF THE INVENTION

The present application relates to the electronic lighting arts. More specifically, it relates to lamp ballast circuits and, in particular, to high intensity discharge (HID) lamp electronic ballasts. One particular application is to use such a ballast in an automobile headlamp assembly, and the present application will be directed with particular attention thereto.

HID lamps are considered to be one of the most effective light sources. These lamps have high electrical to lumen efficiency, long life, good color rendition and good focusing capability when the arc is made short. These favorable characteristics, and in particular the very high brightness and color temperature of commercial HID lamps, make them good candidates for sophisticated applications such as automotive headlights. Application of HID lamps in such demanding environments, however, is far form straightforward due to the many peculiarities of HID light sources. An issue with HID lamps is the need for special ballasts to drive them.

Many lamps have a relatively narrow band of power in which they can operate, and require ballast circuits to rectify, filter, and convert power from a source. Thus, ballast circuits require heat generating components such as transistors, transformers, and the like. The more complex a ballast circuit is, generally the more heat it will produce, and the more likely it is for one of the components to fail. Additionally, the more complex a ballast is, generally the more it will cost. Ballast designers struggle to find the simplest designs to produce a ballast that supports particular lighting applications. Less complexity, and fewer parts lead to a less expensive, more robust and commercially viable ballast circuit.

The reliability of a ballast circuit is of increased importance in the particular application of automobile headlamps, for obvious reasons. It would be undesirable to have frequent drop outs when a motorist is relying on their headlamps to drive at night. Also, with space being an issue, it is desirable to make the ballast circuit as compact as possible, and fewer components help achieve that goal.

Another drawback of typical ballasts is that they use a single voltage source. Since lamp applications that require a ballast are driven by an alternating current (AC) signal, these ballasts utilize extra circuit components to construct a full bridge inverter for providing the power to drive the lamp. These additional components that make up the bridge inverter add to the problems noted above, such as size, cost, heat, and complexity.

The content described in the present application contemplates a new and improved method and apparatus for a ballast circuit that overcomes the above referenced problems and others.

BRIEF DESCRIPTION OF THE INVENTION

According to one aspect of the present application, a high intensity discharge lamp ballast powered by an external DC voltage source is provided. The ballast includes a positive DC to DC converter that acts as a positive voltage source to a lamp. The ballast also includes a negative DC to DC converter that acts as a negative voltage source to the lamp. A first, positive low frequency switch and a second, negative low frequency switch oscillate periods of conductivity to provide power to the lamp.

DETAILED DESCRIPTION OF THE INVENTION

Figure 1:
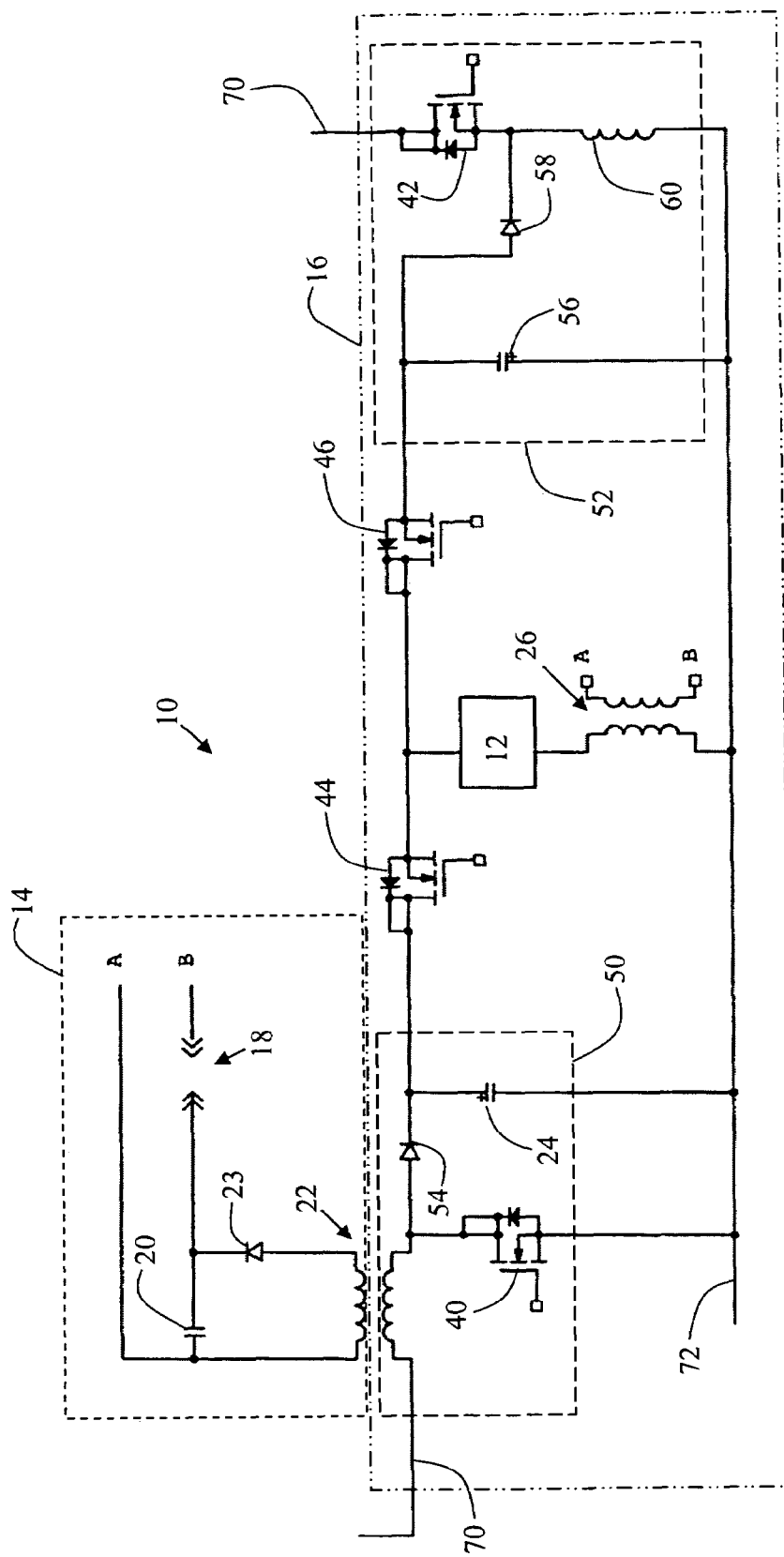
FIG. 1 is a circuit diagram of an exemplary ballast incorporating concepts of the present application.

With reference to FIG. 1, an exemplary HID ballast 10 connected to an HID lamp 12 is shown. High intensity discharge lamps require a high striking voltage, on the order of 18 kV to 30 kV. During steady state running, however, the voltage demands to keep the lamp 12 running after it has been ignited are significantly less. Therefore, the ballast circuit 10 includes a startup portion 14 and a steady state portion 16.

When power is first applied to the ballast 10, the startup portion 14 is open. A spark gap 18 has a threshold voltage that must be overcome before the startup portion 14 provides power to the lamp. Resultantly, power is stored in capacitor 20 until the voltage across the spark gap 18 reaches the threshold voltage. The threshold voltage of the spark gap 18 in this embodiment is approximately 800 V, and the capacitor 20 may be a 70 nF 1000 V capacitor.

As power is not yet needed in the steady state portion 16, because the lamp 12 is not yet lit, the transformer 22 boosts the voltage applied to the steady state portion 16 to break down the spark gap 18. Diode 23 is a rectifier that converts the AC signal of the transformer output into a DC signal and helps prevent stored energy from undesirably bleeding back across the transformer. Diode 23 is preferably a 1000 V 1 A diode. Preferably, the voltage applied to the steady state portion 16 that is, the voltage seen across the capacitor 24 is essentially doubled by transformer 22. Capacitor 24 is preferably a 0.22 μF 450 V capacitor.

Figure 2:
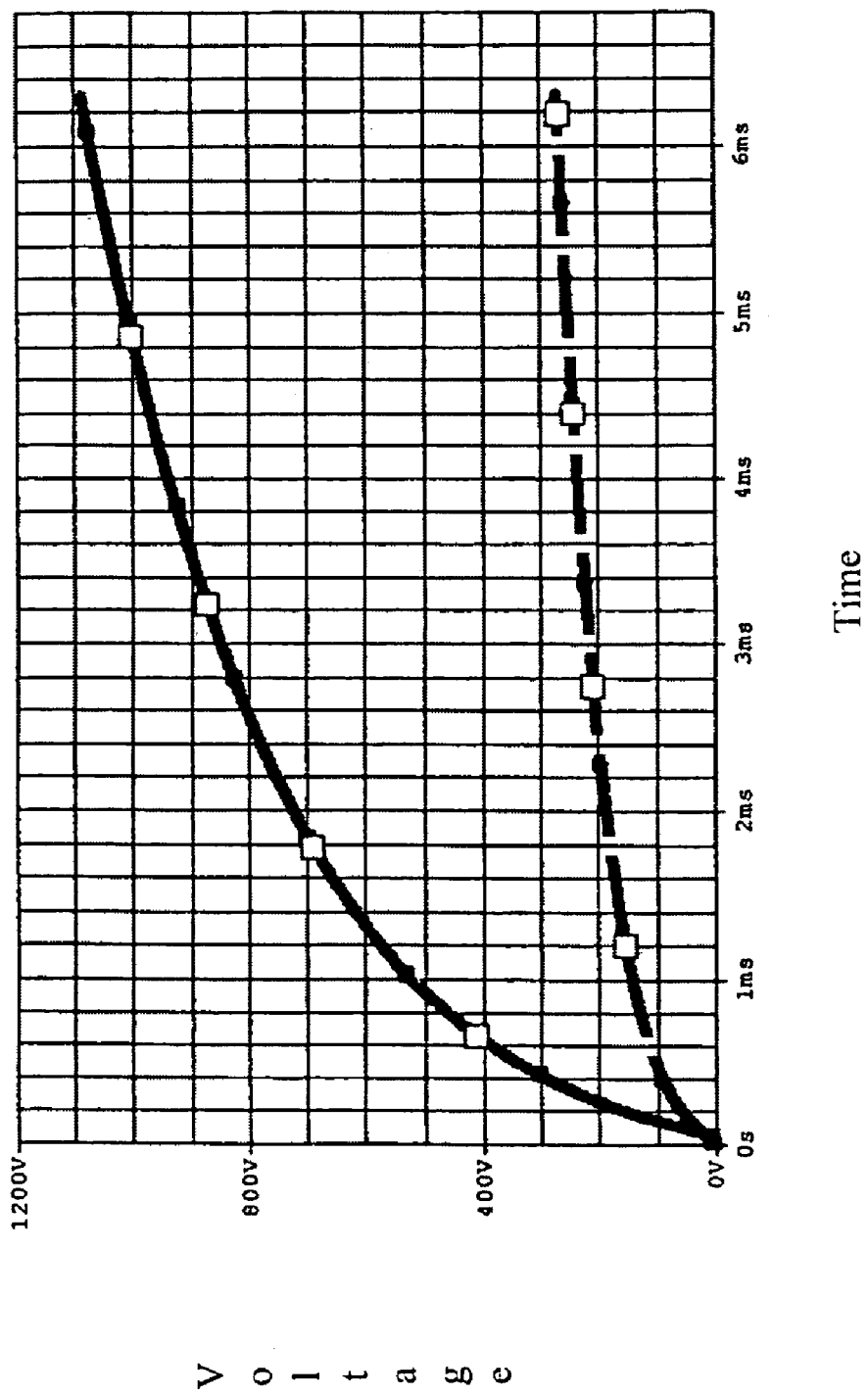
FIG. 2 is a voltage/time comparison of voltage applied to a startup portion of the ballast during lamp startup.

With reference to FIG. 2, and continuing reference to FIG. 1, the dashed line represents the voltage seen across capacitor 24 and the solid line represents the voltage seen across the capacitor 20. As can be seen, the voltage on capacitor 20 reaches about 800 V, making the spark gap 18 conductive and transferring the energy stored in capacitor 20 to the primary side of transformer 26 around 3 milliseconds after power is applied to the ballast 10.

Before application to the lamp 12, however, the voltage is boosted once again by transformer 26. Transformer 26 boosts the voltage seen across its primary winding up to the lamp ignition voltage, that is, from about 18 kV to 30 kV depending on the lamp. In the present embodiment, transformer 26 boosts the voltage to about 25 kV. As shown in FIG. 2, the steady state portion 16 still only sees less than about 300 V (e.g. the dashed line). So the startup portion 14 enables the lamp 12 to be struck with a relatively high ignition voltage while insulating the more sensitive components of the steady state portion 16.

After the lamp 12 is ignited, the steady state portion takes over operation of the lamp 12. After the capacitor 20 discharges, the voltage seen across the spark gap 18 drops to below the threshold voltage and stays there as long as the steady state portion 16 is operating. Thus, the startup portion 14 is able to provide the sufficiently large voltage to ignite the lamp 12 without it being applied to the rest of the ballast circuit 10 and then cuts out during normal operation of the ballast 10.

Put another way, when the driver of an automobile activates their headlamps, what they actually are doing is providing 12 volts DC to the ballast 10. Then a first high frequency switch 40 starts oscillating, building up voltage on capacitor 24 while also putting energy across the transformer 22, building up voltage on capacitor 20. Once this voltage reaches the spark gap 18 threshold voltage, it arcs across the spark gap 18 applying the energy to transformer 26, which boosts it to the ignition voltage. At this point, the steady state portion 16 knows that the lamp has been lit and takes over control of the lamp 12 starting oscillation of the ballast circuit 10.

Figure 3:
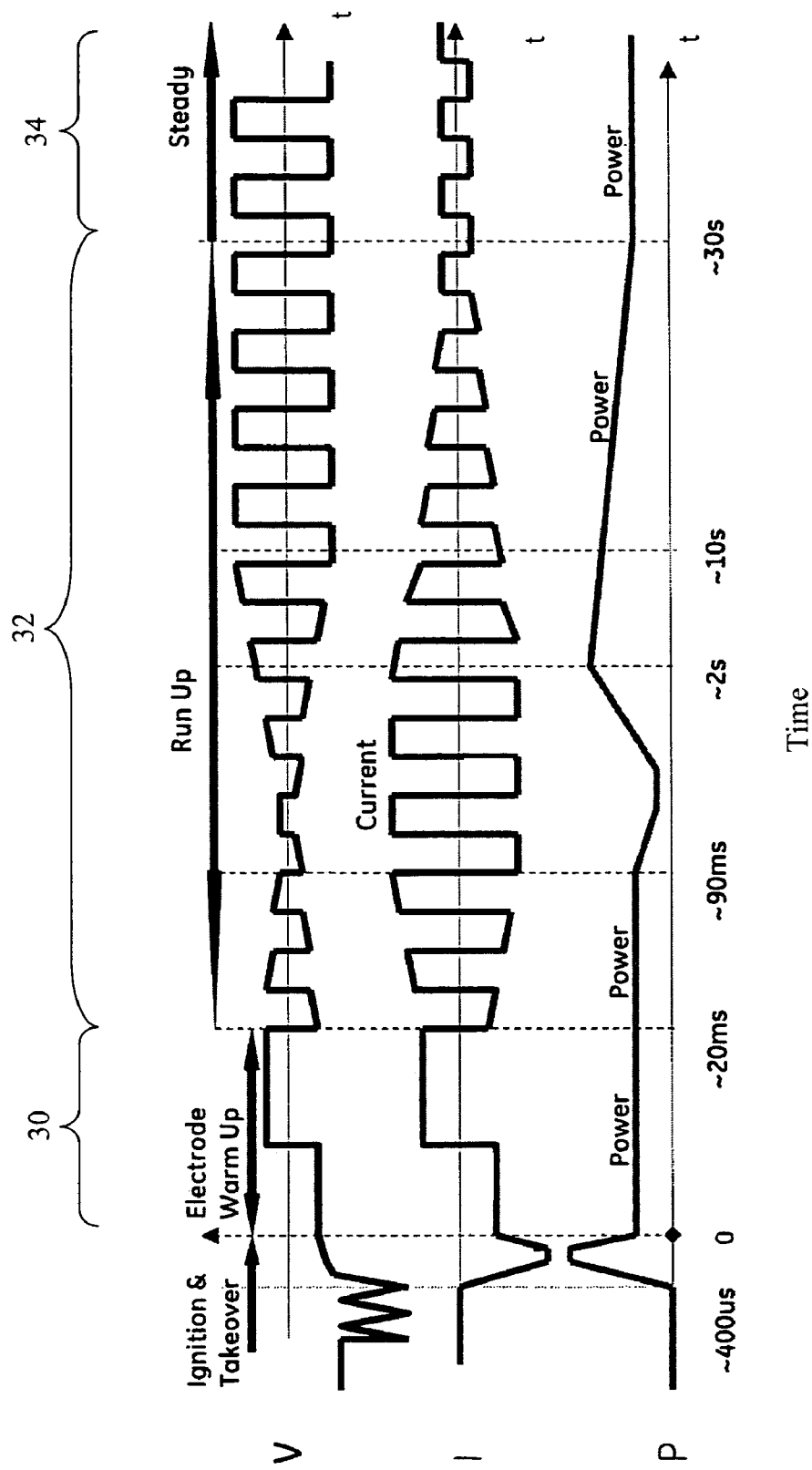
FIG. 3 depicts voltage, current, and power supplied to the ballast during pre-steady-state operation of the lamp.

After ignition of the lamp 12, the steady state portion takes over operation of the circuit. With reference to FIG. 3, there are three phases of operation that the ballast 10 facilitates. Right after the steady state portion 16 takes over control of the lamp 12 at time=0, there is an electrode warm up phase 30. Following the electrode warm up phase 30 is a run up phase 32. Finally, after the run up phase 32 the lamp ballast 10 enters steady state operation 34. As can be seen in FIG. 3, from top to bottom, relative voltage, current, and power waveforms are depicted as they are applied by the ballast 10. The warm up phase lasts for approximately 20 milliseconds, followed by the run up phase, which can last as long as 30 seconds. Then the ballast 10 enters steady state operation. Again, the lamp is already lit during all of these phases after time=0 in FIG. 3. By applying the depicted waveforms to the ballast 10, no external sensor is needed to check the lamp temperature and light output. The ballast 10 will continuously monitor and control the lamp voltage and current. This is so it can keep the power applied to the lamp 12 constant over time as it is depicted in FIG. 3.

With more particularity to the steady state portion 16 of the ballast 10, reference is again made to FIG. 1, which employs a four switch design. The four switches are the first high frequency switch 40, a second high frequency switch 42, a first low frequency switch 44 and a second low frequency switch 46. The high frequency switches 40, 42 may operate at about 100 kHz, but could operate between about 75 kHz to 125 kHz, and the low frequency switches preferably operate at about 400 Hz, but could operate anywhere in the range of 250 Hz to 500 Hz. The high frequency switches may be 500 V 20 A MOSFETs. The low frequency switches 44, 46 provide the inverter function to the lamp by alternately switching the positive and negative supplies during normal run operation, and may be 600 V 12 A MOSFETs. Other transistors, of course, can be used.

The first high frequency switch 40 is part of a positive DC to DC converter 50 and the second high frequency switch 42 is part of a negative DC to DC converter 52. A DC to DC converter generally includes a switch, an inductor, a diode and a capacitor. The positive DC to DC converter includes switch 40, the primary winding of transformer 22, capacitor 24, and diode 54. Diode 54 may be a 600 V 5 A ultra fast diode. The negative DC to DC converter 52 includes switch 42, capacitor 56, diode 58, and inductor 60. The capacitor 56 may be a 0.22 µF 200 V capacitor. The diode 58 may be a 600 V 5 A ultra fast diode. The value of inductor 60 varies depending on the design parameters of the ballast. It is to be understood that while component values are provided for the illustrated embodiment, component values are selected based on several factors, including, but not limited to, what type of DC to DC converters are being used, the type of lamp 12 (which would affect starting and operating specifications, etc.) the application (industrial, all-weather, indoor residential, etc.) and the like.

Generally, an HID lamp must operate between positive and negative voltages. Existing systems typically utilize a single power source and a full bridge rectifier to produce the needed voltage variance. As seen from the point of view of the lamp 12, in the present system, the positive DC to DC converter 50 is a positive power supply, and the negative DC to DC converter 52 is a negative power supply. Resultantly, the ballast 10 can produce both positive and negative drive voltages for the lamp that are independently controllable. There are several reasons for having independent positive and negative voltage sources. First, for the previously stated reason that an HID lamp operates between alternating positive and negative voltages. Another reason is to simplify the ballast by reducing the number of power switches and increasing its efficiency.

Another advantage of having separate positive and negative voltage sources, as mentioned above, is that they can be independently controlled. This is not the case with a single voltage source. Generally, when the positive DC to DC converter 50 is providing power, the first low frequency switch 44 is conductive. Thus, the positive voltage is applied to the lamp 12. Likewise, when the negative DC to DC converter 52 is providing power, then the second low frequency switch 46 is conductive, applying the negative voltage to the lamp 12. This operation alone would produce a normal square wave to drive the lamp 12 (e.g. the steady state portion 34 in FIG. 3).

With independent voltage sources, however, the typical operation of single source ballasts does not have to occur. When the first low frequency switch 44 is conducting, for instance, the negative voltage source input 72 can still be providing power to the ballast 10, and vice versa. If the negative source input 72 provides power to the ballast 10 when the first low frequency switch 44 is conducting, the lamp 12 does not see that source input 72, but rather power is being stored in the converter 52. The reverse is also true: when the second low frequency switch 46 is conducting and the positive source 70 is providing power, the lamp 12 does not see the positive source input 70 but power is being stored in the converter 50.

Figure 4:
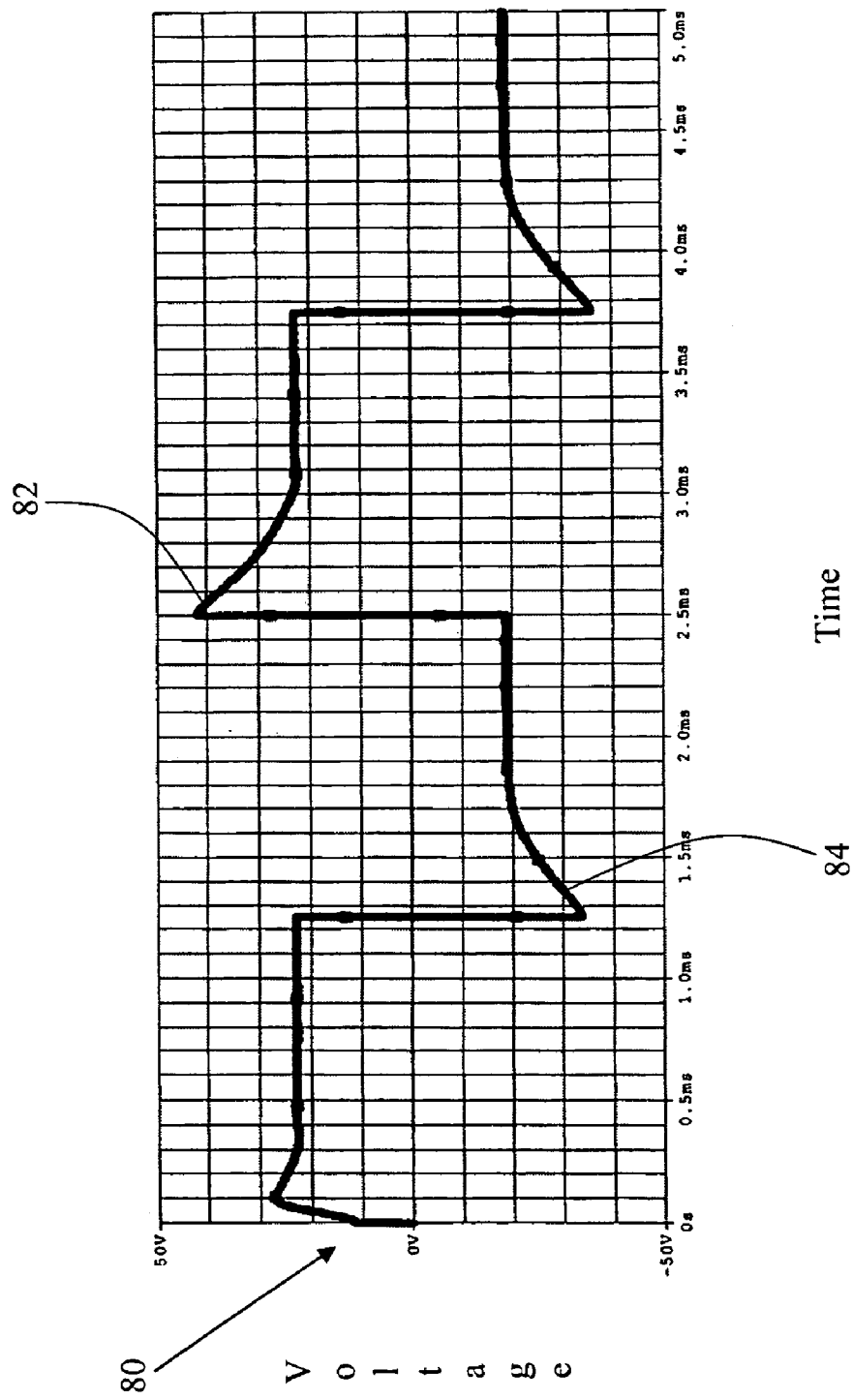
FIG. 4 depicts an exemplary waveform applied to the lamp during warm-up and run-up phases.

This becomes relevant when the low frequency switch 44, 46 that is not currently conducting becomes conductive. At this point, when the low frequency switches 44, 46 switch, the lamp 12 sees the current provided by the source input (70 or 72, depending on which low frequency switch (44 or 46) is conductive) and the power that was stored in the DC to DC converter (50 or 52) during the last half-cycle. This provides the lamp with an in-rush current that modifies the typical square wave provided to operate the lamp 12. As shown in FIG. 4, the in-rush currents manifest in the form of leading edge voltage spikes on the square wave 80. When the first low frequency switch 44 turns conductive, and the lamp 12 sees both the voltage source input 70 and the power stored in converter 50, a positive leading edge spike 82 occurs. Similarly, when the second low frequency switch 46 turns conductive, the lamp 12 sees both the voltage source input 72 and the power stored in the converter 52 from the last half-cycle, and a negative leading edge spike 84 occurs. The in-rush currents are provided over the course of the warm-up and run-up phases. The ballast 10 decays them over time so that no in rush current is supplied during steady state running of the lamp 10, producing an actual square wave drive signal. The in-rush currents decay over time, but initially they are sufficient to produce leading edge voltage spikes that are about 80-100% of the running voltage of the lamp 10.

Existing devices that utilize full bridge inverters do not apply this in-rush current at the beginning of each half cycle, and thus produce a more standard square wave. Having the in-rush current is beneficial during the warm up period of the lamp (32 in FIG. 3). It increases the lamp life, warms the lamp faster, and cures the foremost source of lamp drop-out. The amount of in-rush current provided to the lamp 12 is decreased as the lamp 12 warms. Eventually, no in-rush current is provided, so that a square wave is provided to the lamp 12 at its operating voltage for steady state operation. As shown in FIG. 3, the current provided to the lamp is decreased from its peak from about 2 seconds after takeover to steady state running, which can take up to about 30 seconds. FIG. 4 shows the first 5 milliseconds, but the in-rush current is preferably provided for as long as the lamp 12 is in its run up phase 32. As depicted in FIG. 4, the preferred waveform is a square wave with leading edge spikes, but with independently controlled voltage sources, many other wave shapes can be produced that cannot be produced using a single power supply.

While it is to be understood the described circuit may be implemented using a variety of components with different component values, provided below is a listing for one particular embodiment when the components have the following values:

| Reference Character | Component |
|---|---|
| Capacitor 20 | 70 nF 1000 V |
| Transformer 22 | 300 V in, 800 V out |
| Diode 23 | 1000 V 1 A |
| Capacitor 24 | 0.22 µF 450 V |
| Transformer 26 | 800 V in, 25,000 V out |
| Switch 40, 42 | 500 V 20 A MOSFET |
| Switch 44, 46 | 600 V 12 A MOSFET |
| Ultra fast diode 54 | 600 V 5 A |
| Capacitor 56 | 0.22 µF 200 V |
| Ultra fast diode 58 | 600 V 5 A |

The concepts have been described with reference to the preferred embodiments. Obviously, modifications and alterations will occur to others upon reading and understanding the preceding detailed description. It is intended that the claims be construed as including all such modifications and alterations.

What is claimed is:

1. A high intensity discharge lamp ballast powered by an external DC voltage source comprising:
   a positive DC to DC converter acting as a positive voltage source to a lamp;
   a negative DC to DC converter acting as a negative voltage source to the lamp;
   a first low frequency switch; and
   a second low frequency switch, wherein the first and second low frequency switches oscillate periods of conductivity to provide power to a lamp;
   wherein the ballast provides a decaying in-rush current that is initially 80-100% of a steady state lamp voltage to the lamp every time one of the low frequency switches becomes conductive during a lamp warm-up phase and a lamp run-up phase.

2. The high intensity discharge lamp ballast as set forth in claim 1, wherein the positive and negative DC to DC converters include:
   a high frequency switch, a diode, a capacitor, and an inductor.

3. The high intensity discharge lamp ballast as set forth in claim 1, wherein the positive and negative converters are independently controlled.

4. The high intensity discharge lamp ballast as set forth in claim 1, wherein the positive DC to DC converter includes a first high frequency switch, and the negative DC to DC converter includes a second high frequency switch.

5. The high intensity discharge lamp ballast as set forth in claim 1, wherein the ballast is integrated into an automobile headlamp assembly.

6. The high intensity discharge lamp ballast as set forth in claim 1, wherein the ballast provides the in-rush current in the form of leading edge voltage spikes to the lamp.

7. The high intensity discharge lamp ballast as set forth in claim 1 further comprising a startup portion; and,
   a lamp drive portion that includes less than five switching components for providing an operating signal to the lamp and providing pulse width modulation of input signals.

8. The high intensity discharge lamp ballast as set forth in claim 7, wherein the ballast is integrated into an automobile headlamp assembly.

9. The high intensity discharge lamp ballast as set forth in claim 7, wherein the lamp drive portion includes four switching elements.

10. The high intensity discharge lamp ballast as set forth in claim 9, wherein the switching elements include two high frequency switches and two low frequency switches.

11. The high intensity discharge lamp ballast as set forth in claim 10, wherein the high frequency switches operate at 75 kHz to 125 kHz.

12. The high intensity discharge lamp ballast as set forth in claim 11, wherein the high frequency switches operate at a frequency of approximately 100 kHz.

13. The high intensity discharge lamp ballast as set forth in claim 10, wherein the low frequency switches operate at 250 Hz to 500 Hz.

14. The high intensity discharge lamp ballast as set forth in claim 13, wherein the low frequency switches operate at a frequency of approximately 400 Hz.

15. The high intensity discharge lamp ballast as set forth in claim 7, further including:
   a positive power source for providing positive current to the lamp ballast; and,
   a negative power source for providing negative current to the lamp ballast.

16. The high intensity discharge lamp ballast as set forth in claim 15, wherein the positive and negative power sources are independently controlled.

17. A high intensity discharge lamp ballast powered by an external DC voltage source comprising:
   a positive DC to DC converter acting as a positive voltage source to a lamp;
   a negative DC to DC converter acting as a negative voltage source to the lamp;
   a first low frequency switch; and
   a second low frequency switch, wherein the first and second low frequency switches oscillate periods of conductivity to provide power to a lamp,
   wherein the ballast provides an in-rush current to the lamp during a lamp warm-up phase and a lamp run-up phase.

18. The high intensity discharge lamp ballast as set forth in claim 17, wherein the positive and negative converters are independently controlled.

19. The high intensity discharge lamp ballast as set forth in claim 17, wherein the positive DC to DC converter includes a first high frequency switch, and the negative DC to DC converter includes a second high frequency switch.

20. The high intensity discharge lamp ballast as set forth in claim 17, wherein the ballast provides the in-rush current in the form of leading edge voltage spikes to the lamp.

21. The high intensity discharge lamp ballast as set forth in claim 20, wherein the ballast provides a decaying in-rush current that is initially 80-100% of a steady state lamp voltage to the lamp every time one of the low frequency switches becomes conductive during a lamp warm-up phase and a lamp run-up phase.

* * * * *